(12) United States Patent
Lee et al.

(10) Patent No.: US 11,976,720 B1
(45) Date of Patent: May 7, 2024

(54) SPHERE-TYPE SHIFT CONTROL APPARATUS FOR ELECTRONIC SHIFT SYSTEM

(71) Applicants: Hyundai Motor Company, Seoul (KR); Kia Corporation, Seoul (KR)

(72) Inventors: Sung Hun Lee, Seoul (KR); Chul Ho Chun, Gyeongju-Si (KR); Min Gwon Lee, Gyeongsan-Si (KR); Tae Jo Kim, Daegu (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/134,417

(22) Filed: Apr. 13, 2023

(30) Foreign Application Priority Data

Nov. 2, 2022 (KR) .......................... 10-2022-0144637

(51) Int. Cl.
*F16H 59/08* (2006.01)
*F16H 59/02* (2006.01)

(52) U.S. Cl.
CPC .......... *F16H 59/08* (2013.01); *F16H 59/0278* (2013.01); *F16H 2059/026* (2013.01); *F16H 2059/081* (2013.01)

(58) Field of Classification Search
CPC .. F16H 2059/081; F16H 59/08; F16H 59/044; G06F 3/03549; G06F 3/0354; G06F 3/033; G06F 9/047; G06F 9/053; G06F 2009/04714; G06F 2009/04711; G06F 2009/04707; Y10T 74/20396
USPC ............................... 74/473.3, 473.33, 473.34
See application file for complete search history.

(56) References Cited

U.S. PATENT DOCUMENTS 11,279,365 B2    3/2022    Cho et al.

FOREIGN PATENT DOCUMENTS

| DE | 102021201229 A1 | * | 8/2022 |
|---|---|---|---|
| KR | 20120001948 U | * | 5/2012 |
| KR | 10-1575370 B1 | | 12/2015 |
| KR | 10-2020-0121233 | | 10/2020 |
| KR | 10-2021-0138956 | | 11/2021 |
| KR | 10-2021-0151586 | | 12/2021 |
| KR | 10-2022-0065468 | | 5/2022 |

* cited by examiner

*Primary Examiner* — T. Scott Fix
(74) *Attorney, Agent, or Firm* — MORGAN, LEWIS & BOCKIUS LLP

(57) ABSTRACT

A sphere-type shift control apparatus of an electronic shift system includes a spherical mechanism that includes a shift control portion on a first hemispherical portion of the spherical mechanism and a design portion on a second hemispherical portion of the spherical mechanism. The design portion is configured to provide indirect illumination and transmit images. Power is transmitted from a motor to the rotation shaft of the spherical mechanism using a timing belt or a wire.

14 Claims, 11 Drawing Sheets

SPHERE-TYPE SHIFT CONTROL APPARATUS FOR ELECTRONIC SHIFT SYSTEM

CROSS REFERENCE TO RELATED APPLICATION

The present application claims priority to Korean Patent Application No. 10-2022-0144637, filed Nov. 2, 2022, the entire contents of which is incorporated herein for all purposes by this reference.

BACKGROUND OF THE PRESENT DISCLOSURE

Field of the Present Disclosure

The present disclosure relates to a sphere-type shift control apparatus for an electronic shift system, and more particularly, to a sphere-type shift control apparatus for an electronic shift system including a spherical mechanism provided with a shift control portion and a design portion on one hemispherical portion and the other hemispherical portion.

Description of Related Art

A spherical mechanism of a shift control apparatus is provided with a shift control part on one hemispherical part and a design part on the other hemispherical part, the design part being configured to provide indirect illumination and transmit images.

The spherical mechanism is rotatably disposed on a housing. In rotation, one hemispherical part of the spherical mechanism is exposed to the interior of a vehicle from the housing and the other hemispherical part remains hidden within the housing.

For example, when the vehicle is turned on or switched from autonomous mode to manual driving mode, the spherical mechanism is rotated so that the shift control part located in one hemispherical part is exposed to the interior of the vehicle and the design part located in the other hemispherical part remains hidden within the housing.

In contrast, when the vehicle is turned off or switched to the autonomous mode, the spherical mechanism is rotated so that the design part located in the other hemispherical part is exposed to the interior of the vehicle and the shift control part located in one hemispherical part remains hidden within the housing.

The rotation of the spherical mechanism is typically powered by a motor. Power from the motor is transmitted to a rotation shaft of the spherical mechanism through a gear unit to rotate the spherical mechanism.

In a situation in which the shift control part is exposed to the interior of the vehicle and a driver controls the shift control part, it is required to be able to prevent unintended rotation of the spherical mechanism to obtain safety. In this regard, a sphere-type shift control apparatus also is provided with a shift lock function or a self-locking function to restrain the rotation of the spherical mechanism using holding torque of the motor.

Furthermore, when a shift lock may not be released using power from the motor due to a failure of a controller of the shift lock or the motor, forcible release of the shift lock by a user is required. In this regard, the sphere-type shift control apparatus also is provided with a shift lock release function or an override function.

As described above, to realize the shift lock function of the spherical mechanism and transmit power from the motor to the rotation shaft of the spherical mechanism, a gear unit including a worm gear and a worm wheel gear has been used in the related art.

However, in consideration of characteristics of a gear structure, the gear unit including the worm gear and the worm wheel gear disadvantageously has noise caused by high speed rotation of the worm gear and the friction between the gears due to a high reduction ratio of the motor. In particular, as an output torque is reduced due to low efficiency, the ability to increase the speed of rotation of the spherical mechanism serving as an output end is limited, which is problematic.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a sphere-type shift control apparatus for an electronic shift system, the apparatus being configured to transmit power from a motor to a spherical mechanism using a belt or a wire. Because no gear structure is used as a power transmission unit, a simplified configuration may be realized to reduce weight, fabrication cost, and noise and to increase the speed of rotation of the spherical mechanism.

The present disclosure is also intended to simplify a configuration for realizing a shift lock function and a shift lock release function.

To achieve at least one of the above objectives, in an aspect of the present disclosure, there is provided a sphere-type shift control apparatus for an electronic shift system, the apparatus including: a spherical mechanism, wherein the spherical mechanism includes a shift control portion on a first hemispherical portion of the spherical mechanism and a design portion on a second hemispherical portion of the spherical mechanism; and a power transmission component coupling a motor and the spherical mechanism and configured to transmit power from the motor to the spherical mechanism, the power transmission component including a timing belt or a wire.

A driving pulley and a driven pulley may be coupled to the motor and a rotation shaft of the spherical mechanism, and the timing belt or the wire may connect the driving pulley and the driven pulley in a power transmittable manner.

Gear teeth having the same pitch may be provided on an internal portion of the timing belt, an external diameter portion of the driving pulley, and an external diameter portion of the driven pulley so that the timing belt and the driving pulley may be coupled by gear teeth engagement and the timing belt and the driven pulley are coupled by gear teeth engagement.

A swaging pin may be provided on a line of the wire to be fixed to an external diameter portion of the driving pulley. A pair of pulley levers may be provided coaxially with the driven pulley, with first and second end portions of the wire being coupled to the pulley levers, respectively.

a pulley spring may be disposed between the pulley levers and connected to the pulley levers to apply elastic force to the pulley levers to draw the first end portion and the second end portion of the wire, maintaining a tension of the wire.

A permanent magnet may be coupled to a shaft of the motor. A printed circuit board (PCB) may be provided in the housing and includes a Hall sensor facing the permanent magnet. The Hall sensor may detect a change in a magnetic field of the permanent magnet when the motor shaft rotates. The PCB may locate the spherical mechanism and is configured to control an operation of the motor using a signal from the Hall sensor.

A solenoid including a plunger may be disposed in the housing to face the driven pulley. First and second pulley recesses into which the plunger is inserted may be provided on the external diameter portion of the driven pulley to be spaced from each other.

When the plunger is inserted into the first pulley recess or the second pulley recess, rotation of the spherical mechanism may be stopped and the spherical mechanism is fixed in position. When the plunger has slipped from both the first pulley recess and the second pulley recess, the spherical mechanism may be rotatable about the rotation shaft.

The first pulley recess and the second pulley recess may be spaced from each other 180° so that when the plunger is inserted into the first pulley recess, the spherical mechanism may be fixed in position, with the shift control portion being exposed outwardly of the housing.

An inclination angle of a side surface of first pulley recess may be the same as an insertion angle of the plunger so that when a weight of a user is applied to the driven pulley as the user manipulates the shift control portion, repulsive force may act in a direction opposite to the weight, and thus the spherical mechanism may be restrained so as not be rotatable, realizing a shift lock.

A protrusion may protrude outwardly from a mouth of the first pulley recess. In a position in which the plunger is inserted into the first pulley recess, the protrusion may further enhance restrained rotation of the spherical mechanism.

The first pulley recess and the second pulley recess may be spaced from each other 180° so that when the plunger is inserted into the second pulley recess, the spherical mechanism may be fixed in position, with the design portion being exposed outwardly of the housing.

An inclination angle of a side surface of the second pulley recess may be greater than an insertion angle of the plunger so that when a weight of a user is applied to the driven pulley as the user manually rotates the spherical mechanism, the plunger may be moved backward due to the inclination angle greater than the insertion angle, and when the plunger slips from the second pulley recess through the backward movement, the spherical mechanism may be in a shift lock released position in which the spherical mechanism is rotatable by control of the user.

The spherical mechanism rotates 180° about the rotation shaft when the motor may be operated once so that the shift control portion and the design portion are alternately exposed to an interior of a vehicle.

According to an exemplary embodiment of the present disclosure, in the sphere-type shift control apparatus for an electronic shift system according to an exemplary embodiment of the present disclosure, the shift control portion which the driver controls to shift gears may be provided in one hemispherical portion of the spherical mechanism having a shape of a sphere, whereas the design portion configured to provide indirect illumination and transmit images may be provided in the other hemispherical portion of the spherical mechanism. When shift control by rotating the spherical mechanism is required, only the shift control portion may be exposed to the interior of the vehicle through the open area of the housing. When no shift control is required, only the design portion may be exposed to the interior of the vehicle through the open area of the housing. Consequently, it is possible to improve stability by improving visibility and improve product quality using a high tech image.

Furthermore, according to an exemplary embodiment of the present disclosure, the power transmission component configured to transmit power from the motor to the rotation shaft of the spherical mechanism may be implemented as the timing belt or the wire. Compared to the related-art structure transmitting power using gears, it is advantageously possible to reduce weight, fabrication cost, and operating noise based on the simplified configuration and improve the feeling of quality by increasing the speed of rotation of the spherical mechanism.

Furthermore, according to an exemplary embodiment of the present disclosure, the shift lock function and the shift lock release function may be realized using the first pulley recess and the second pulley recess of the driven pulley and the solenoid including the plunger. Due to the simplified configuration, the resultant structure may be advantageously packaged.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
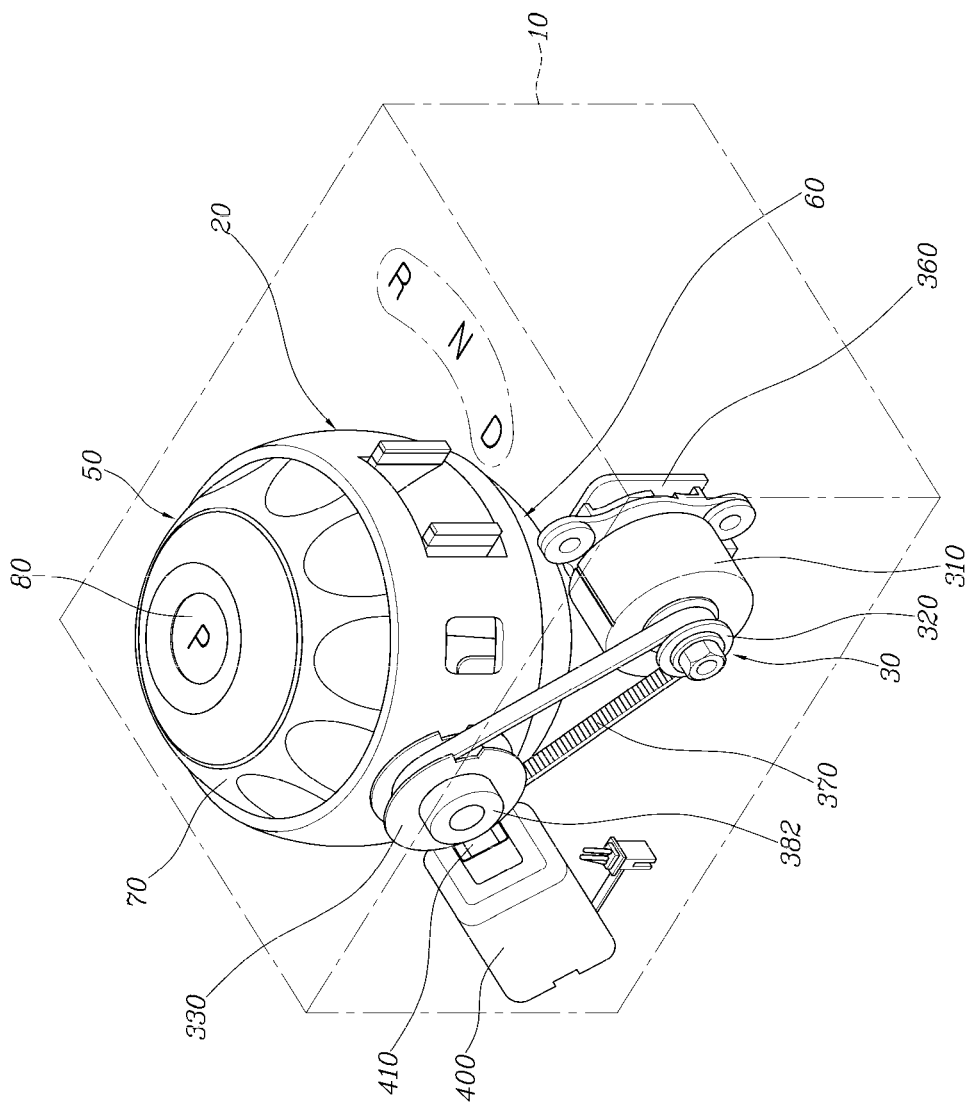
FIG. 1 is a view exemplarily illustrating a sphere-type shift control apparatus of an electronic shift system in which a spherical mechanism is rotated so that a shift control portion is exposed.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to a same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments included in an exemplary embodiment of the present disclosure will be described in detail with reference to the accompanying drawings, in which identical or similar constituent elements are provided the same reference numerals regardless of the reference numerals of the drawings, and a repeated description thereof will be omitted.

Terms "module" and "part" used in the following description are provided or mixed together only considering the ease of generating the specification, and have no meanings or roles that are distinguished from each other by themselves.

In the description of the present disclosure, when it is determined that the detailed description of related art would obscure the gist of the present disclosure, the detailed description thereof will be omitted.

Furthermore, the appended drawings are merely intended to be configured to readily understand the exemplary embodiments included herein, and thus the technical idea included herein is not limited by the appended drawings, and it may be understood to include all changes, equivalents, and substitutions included in the idea and technical scope of the present disclosure.

It will be understood that, although terms "first", "second", etc., may be used herein to describe various elements, these elements should not be limited by these terms. These terms are only used to distinguish one element from another element.

It will be understood that when an element is referred to as being "coupled", "connected", or "linked" to another element, it may be directly coupled or connected to the other element or intervening elements may be present therebetween.

In contrast, it should be understood that when an element is referred to as being "directly coupled", "directly connected", or "directly connected" to another element, there are no intervening elements present.

As used herein, singular forms "a", "an", and "the" are intended to include the plural forms as well, unless the context clearly indicates otherwise.

It will be further understood that terms "comprise", "include", "have", etc., when used in the present specification, specify the presence of stated features, integers, steps, operations, elements, components, and/or combinations thereof but do not preclude the presence or addition of one or more other features, integers, steps, operations, elements, components, and/or combinations thereof.

Furthermore, a term such as "unit" or "control unit" included in names of specific elements, such as a motor control unit (MCU) and a hybrid control unit (HCU), is only a term widely used in naming of a controller that is configured to control a specific function of a vehicle but should not be understood as indicating a generic function unit.

A controller may include a communication device configured to communicate with another control unit or a sensor to control unique functions of the control unit, a memory storing an operating system (OS), logic instructions, input/output information, etc., and one or more processors configured to perform determination, computation, decision required for the control of the unique functions.

Hereinafter, a sphere-type shift control apparatus for an electronic shift system according to exemplary embodiments of the present disclosure will be described with reference to the accompanying drawings.

As illustrated in FIGS. 1 to 11, the sphere-type shift control apparatus for an electronic shift system includes a housing 10, a spherical mechanism 20 rotatably coupled to the housing 10, and a power unit 30 providing rotating power to the spherical mechanism 20 to rotate with respect to the housing 10.

The housing 10 including the spherical mechanism 20 may be fixedly disposed on the console or the center fascia around the driver's seat or be disposed on a seat.

A rotation shaft 40 is coupled to the spherical mechanism 20 to extend through the center portion therethrough. The rotation shaft 40 is disposed to be rotatable with respect to the housing 10.

Thus, when the rotation shaft 40 rotates, the spherical mechanism 20 also rotates with respect to the housing 10. During rotation, one hemispherical portion of the spherical mechanism 20 is exposed to the interior of a vehicle from the housing 10, whereas the other hemispherical portion remains hidden within the housing 10.

In the spherical mechanism 20 having the shape of a sphere, one hemispherical portion is provided with a shift control portion 50, whereas the other hemispherical portion is provided with a design portion 60.

When the spherical mechanism 20 rotates with respect to the housing 10, one of the shift control portion 50 or the design portion 60 is exposed to the interior of the vehicle, whereas the other of the shift control portion 50 or the design portion 60 remains hidden within the housing 10.

The shift control portion 50 is provided with a shift unit which a driver controls for shift control. In an exemplary embodiment of the present disclosure, the shift unit may be implemented as a shift dial 70. In another example, the shift unit may be implemented as a shift button or a shift lever.

When the shift unit is implemented as the shift dial 70 or the shift lever, a separate park (P) position button 80 may be additionally provided.

One shift position among the reverse (R) position, the neutral (N) position, and the driving (D) position may be selected by controlling the shift dial 70. The P position is operated by pressing the P position button 80.

In the shift lever, a driver may select one shift position among the R position, the N position, and the D position by controlling the shift lever, and may operate the P position by pressing the P position button.

In the shift button, a driver may operate the shift unit by pressing one among the P position button, the R position button, the N position button, and the D position button.

Although not shown in the drawings, the shift control apparatus according to exemplary embodiments of the present disclosure may further include a printed circuit board (PCB) configured to receive a control signal generated by controlling the shift unit (e.g., the shift dial or the P position button) and output a control signal to a vehicle control unit (VCU).

The shift unit and PCB may be connected through wires or a cable so that electrical signals may be transmitted therebetween.

When the control signal of the shift unit is generated, the PCB transmits the signal to the VCU, and shift control is electronically performed in response to a signal instructed by the VCU.

The design portion 60 may include a light source and an illumination window. The illumination window may have a pattern of a specific shape on the surface thereof to realize indirect illumination when the light source is turned on. The light source may be turned on or off under the control of the PCB.

The light source of the design portion 60 may be implemented as a light emitting diode (LED). Indirect illumination (e.g., mood lamp light or ambient light) may be realized when the light source is turned on. A welcome function may be realized in response to a gesture of a user.

The illumination window of the design portion 60 may be implemented as a hemisphere of tempered glass or may be a transparent or semitransparent (or translucent) window allowing light from the light source to pass therethrough.

Furthermore, the design portion 60 may include a diffusion member configured to diffuse light from the light source. The diffusion member may be implemented as a prism disposed on the illumination window to face the light source.

Furthermore, the design portion 60 may further include a display device configured to transmit a specific image through the illumination window.

The operation of the display device is controlled by the PCB. A user may transmit a set image through the display device, further improving the visibility of the image.

The power unit 30 includes a motor 310 fixedly disposed in the housing 10, a driving pulley 320 coupled to a motor shaft 311 of the motor 310 to rotate together therewith, a driven pulley 330 coupled to the rotation shaft 40 of the spherical mechanism 20 to rotate together therewith, a power transmission component connecting the driving pulley 320 and the driven pulley 330 to transmit power, a permanent magnet 340 coupled to the motor shaft 311, and a printed circuit board (PCB) 360 fixed to the housing 10 and including a Hall sensor 350 facing the permanent magnet 340.

The driving pulley 320 is coupled to one end portion of the motor shaft 311, and the permanent magnet 340 is coupled to the other end portion of the motor shaft 311.

When the motor shaft 311 rotates in response to the operation of the motor 310, the Hall sensor 350 detects a change in the magnetic field of the permanent magnet 340. The PCB 360 locates the spherical mechanism 20 and is configured to control the operation of the motor 310 using a signal from the Hall sensor 350.

The PCB 360 is configured to control the motor 310 to operate in response to a signal input through an input portion thereof. A signal of the input portion may be one among vehicle on or off signals, door open or close signals, door unlock and lock signals, driving mode change signals (e.g., autonomous and manual driving mode change signals), or control switch or button on or off signals.

When the signal of the input portion is input, the motor 310 is driven under the control of the PCB 360. Power from the motor 310 is transmitted to the rotation shaft 40 through the driving pulley 320, the power transmission component, and the driven pulley 330. Consequently, the rotation shaft 40 rotates with respect to the housing 10, and the spherical mechanism 20 rotates together with the rotation shaft 40.

Figure 2:
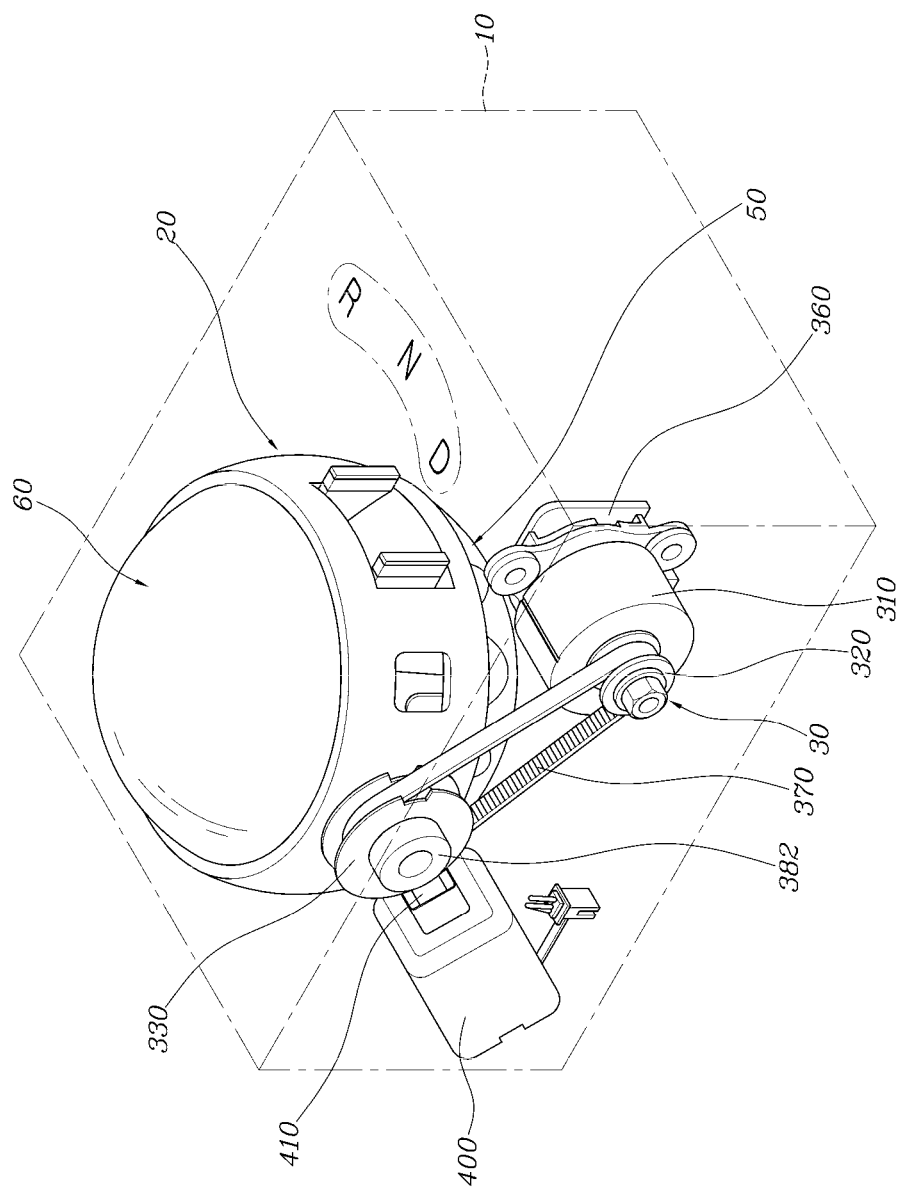
FIG. 2 is a view exemplarily illustrating the sphere-type shift control apparatus in which the spherical mechanism is rotated 180 degrees from the position illustrated in FIG. 1 so that the design portion is exposed.
Figure 3:
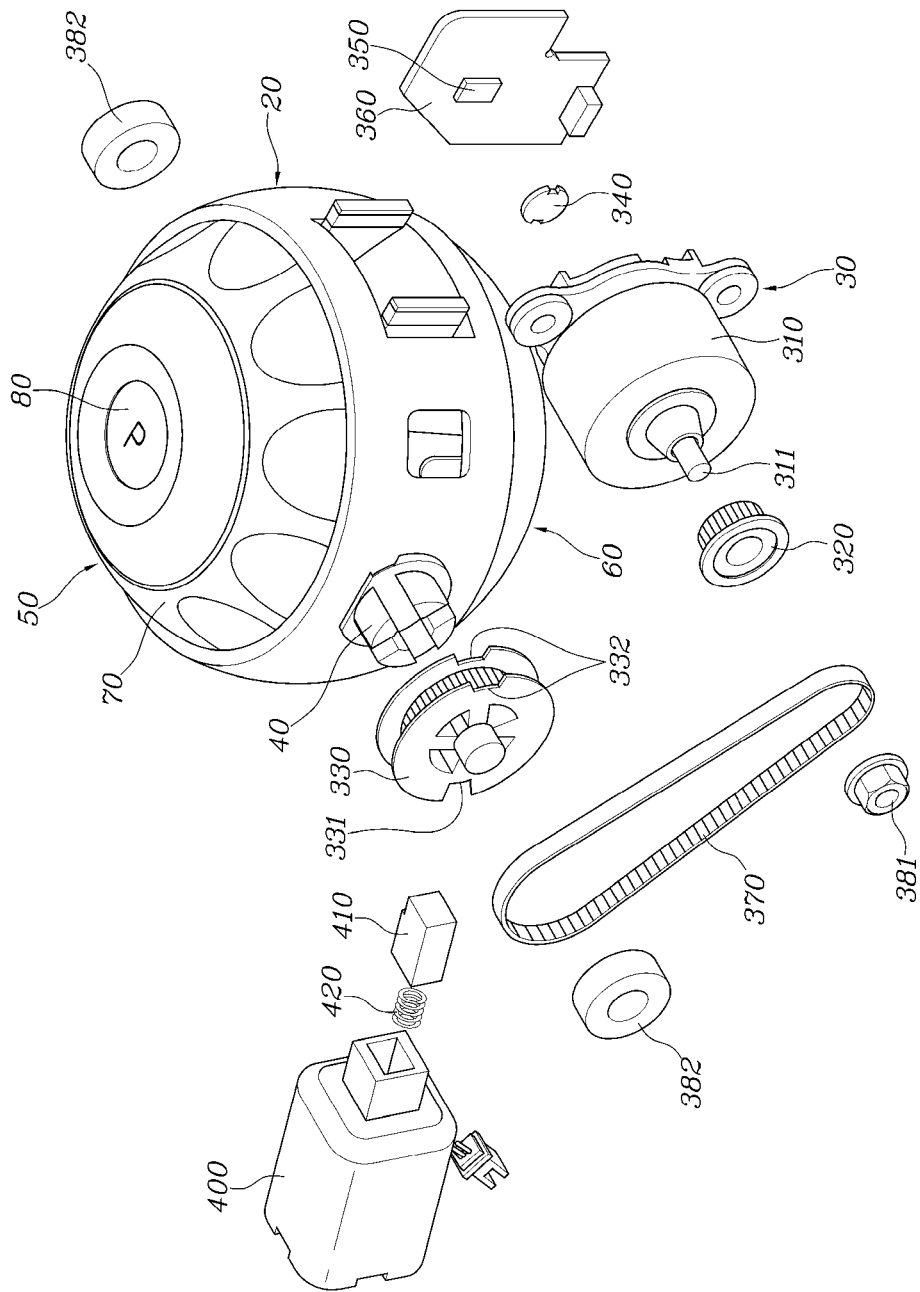
FIG. 3 is a view exemplarily illustrating an exemplary embodiment of a structure transmitting power using the timing belt.
Figure 4:
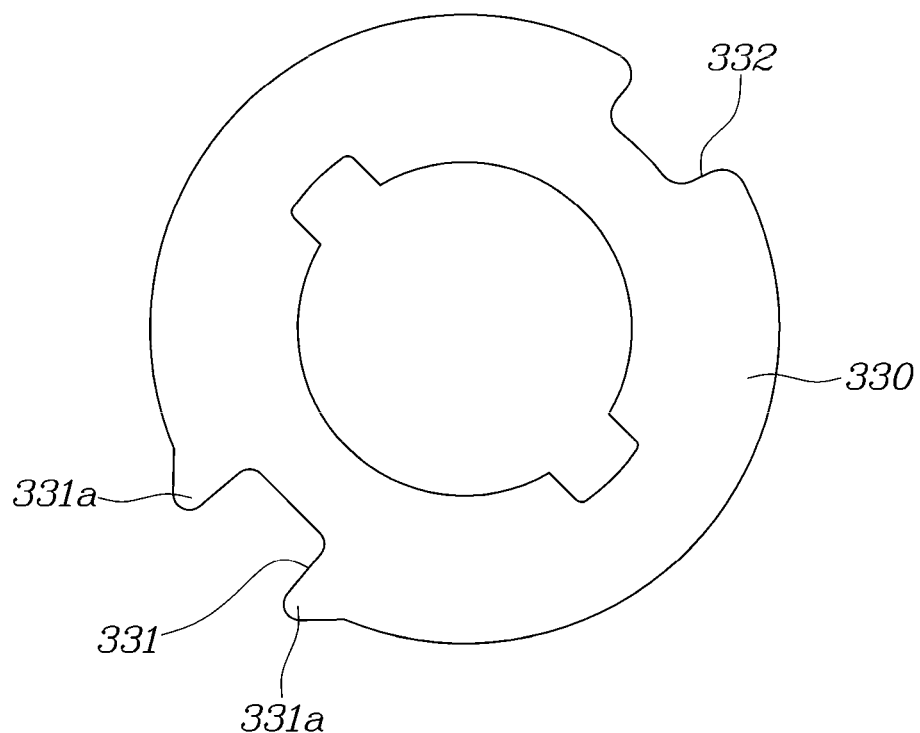
FIG. 4 is a view exemplarily illustrating the driven pulley.

In the spherical mechanism 20, the rotation shaft 40 rotates 180° when the power unit 30 is operated once. Thus, during rotation of the spherical mechanism 20, the shift control portion 50 is exposed to the interior of the vehicle through an open area of the housing 10 as illustrated in FIG. 1, or the design portion 60 is exposed to the interior of the vehicle through the open area of the housing 10 as illustrated in FIG. 2.

In various exemplary embodiments of the present disclosure, the power transmission component configured to connect the driving pulley 320 and the driven pulley 330 to transmit power may be implemented as a timing belt 370 or a wire 390.

FIG. 1, FIG. 2, and FIGS. 3, 5, and 7 illustrates an example in which the timing belt 370 is used as the power transmission component.

The timing belt 370 connects the driving pulley 320 and the driven pulley 330 so that power may be transmitted therebetween. In this regard, to prevent interference, gear teeth having the same pitch are formed on the internal portion of the timing belt 370, the external diameter portion of the driving pulley 320, and the external diameter portion of the driven pulley 330. The timing belt 370 and the driving pulley 320 are coupled by gear teeth engagement, and the timing belt 370 and the driven pulley 330 are coupled by gear teeth engagement.

Fastening of a nut 381 may prevent the driving pulley 320 from being loosened, and a bearing 382 may allow the spherical mechanism 20 to smoothly rotate with respect to the housing 10.

Figure 9:
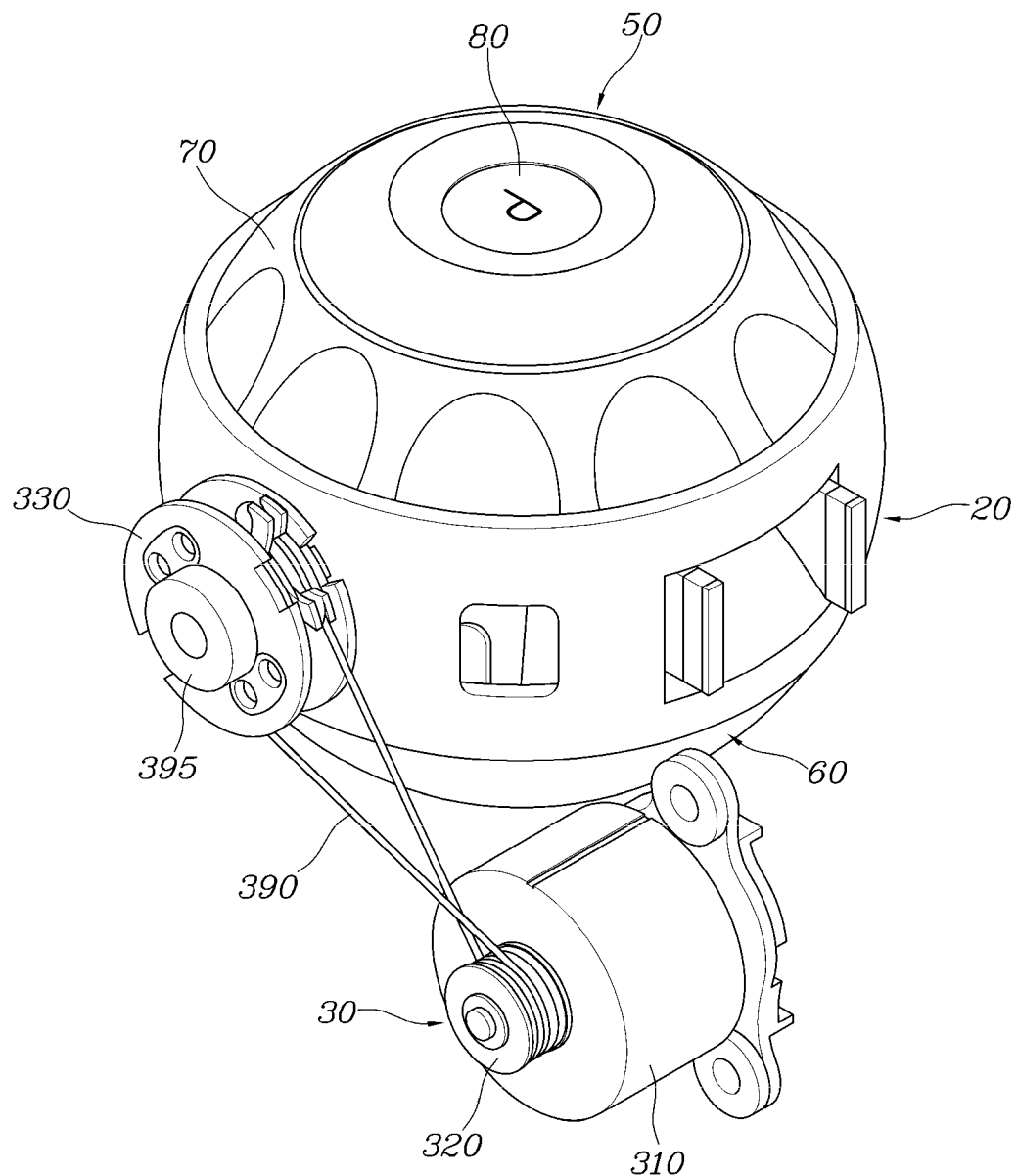
FIG. 9, FIG. 10 and FIG. 11 are views exemplarily illustrating another exemplary embodiment of a structure transmitting power using a wire timing belt.
Figure 10:
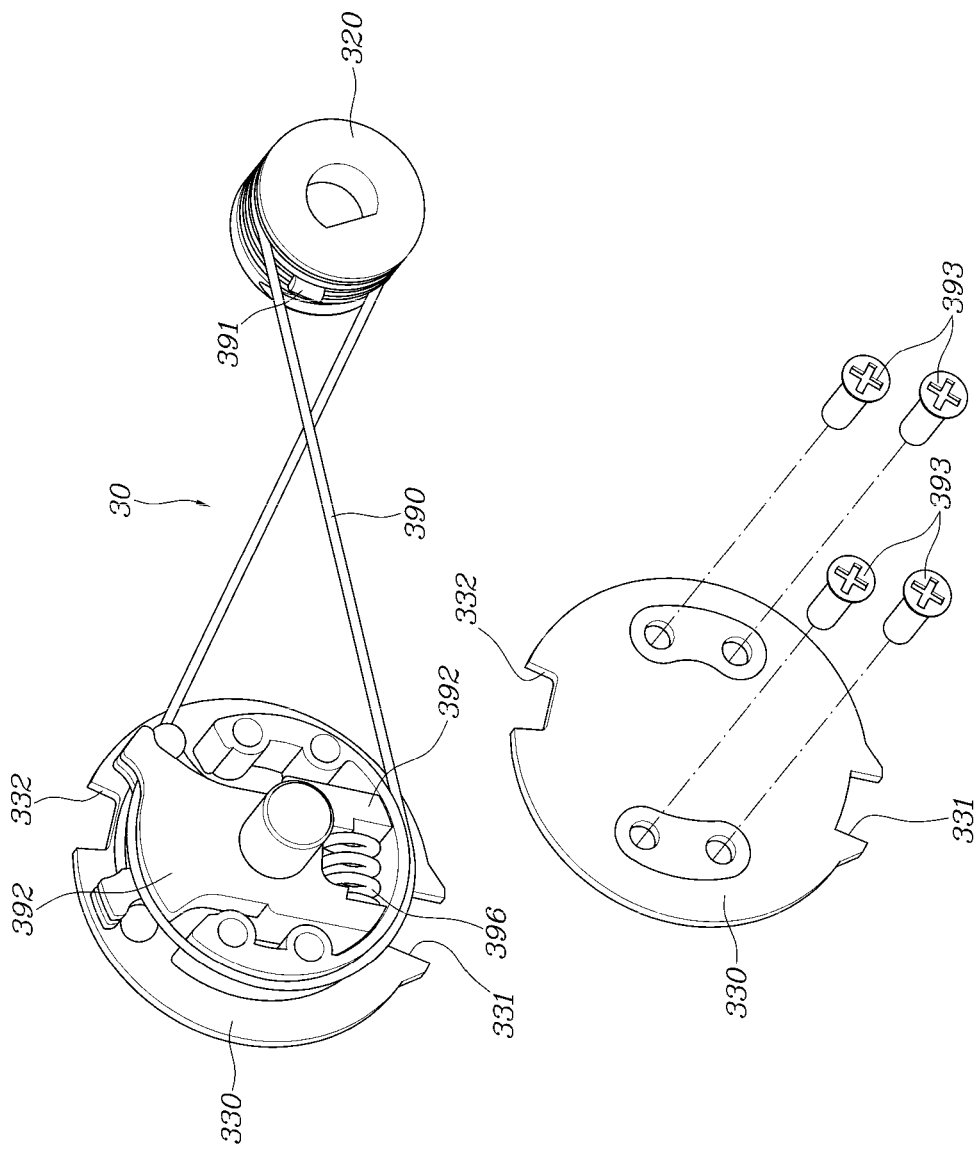
Figure 11:
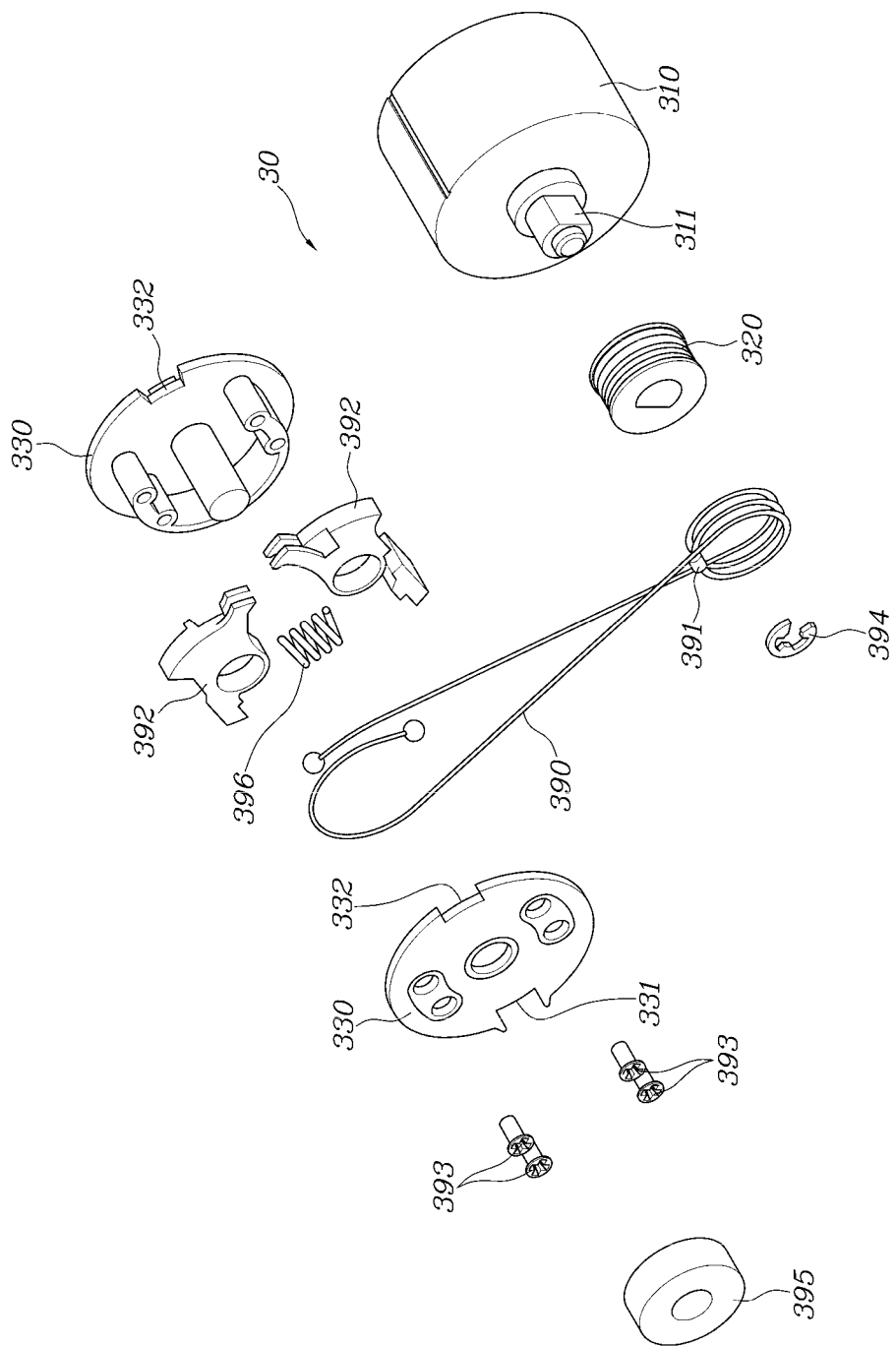

FIG. 9, FIG. 10 and FIG. 11 illustrate an example in which the wire 390 is used as the power transmission component.

The wire 390 connects the driving pulley 320 and the driven pulley 330 so that power may be transmitted therebetween. In this regard, to prevent interference, a swaging pin 391 is provided on the line of the wire 390 to be fixed to the external diameter portion of the driving pulley 320.

Furthermore, a pair of pulley levers 392 are provided coaxially with the driven pulley 330. One end portion of the wire 390 is coupled to one of the pulley levers 392, and the other end portion of the wire 390 is coupled to the other of the pulley levers 392.

The driven pulley 330 includes two separable plate components coupled using a plurality of bolts 393. The two pulley levers 392 are coupled to be coaxial with the driven pulley 330 between two plate components. The two pulley levers 392 are also configured to be rotatable independently of the driven pulley 330.

Fastening of a fixing ring 394 may prevent the driving pulley 320 from being loosened. A bearing 395 may be coupled to the shaft of the driven pulley 330, allowing the spherical mechanism 20 to smoothly rotate with respect to the housing 10.

Furthermore, a pulley spring 396 is disposed between the pair of pulley levers 392 to be connected to the pulley levers 392. The pulley spring 396 applies elastic force to the pulley levers 392 to draw both end portions of the wire 390. In the present manner, the wire 390 may constantly maintain a predetermined level of tension.

In the shift control apparatus according to an exemplary embodiment of the present disclosure, the rotation of the spherical mechanism 20 may be restrained by first and second pulley recesses 331 and 332 provided in the driven pulley 330 and a solenoid 400 including a plunger 410. The present configuration may also realize a shift lock function and a shift lock release function.

That is, in the housing 10, the solenoid 400 including the plunger 410 is provided to face the driven pulley 330. The first pulley recess and the second pulley recess 331 and 332, into which the plunger 410 is inserted, are formed on the external diameter portion of the driven pulley 330 to be spaced from each other.

The plunger 410 of the solenoid 400 is disposed to be supported by the spring 420. When a current is applied to the solenoid 400, the plunger 410 moves backward by overcoming the force of the spring 420. When the applied current is cut off, the plunger 410 is moved forward by restoring force of the spring 420, returning to the original position.

In the backward movement of the plunger 410, the plunger 410 slips into the first pulley recess 331 or the second pulley recess 332. Consequently, the spherical mechanism 20 is released from being locked by the plunger 410 to be rotatable with respect to the housing 10 about the rotation shaft 40.

In contrast, when the plunger 410 is inserted into one of the first pulley recess 331 or the second pulley recess 332 of the driven pulley 330 through the forward movement of the plunger 410, the spherical mechanism 20 is locked by the plunger 410 and thus maintains the restrained position so as not to be rotatable with respect to the housing 10.

The first pulley recess 331 and the second pulley recess 332 are spaced from each other 180° in the circumferential direction of the driven pulley 330. The first pulley recess 331 and the second pulley recess 332 are opened outward of the driven pulley 330.

Figure 5:
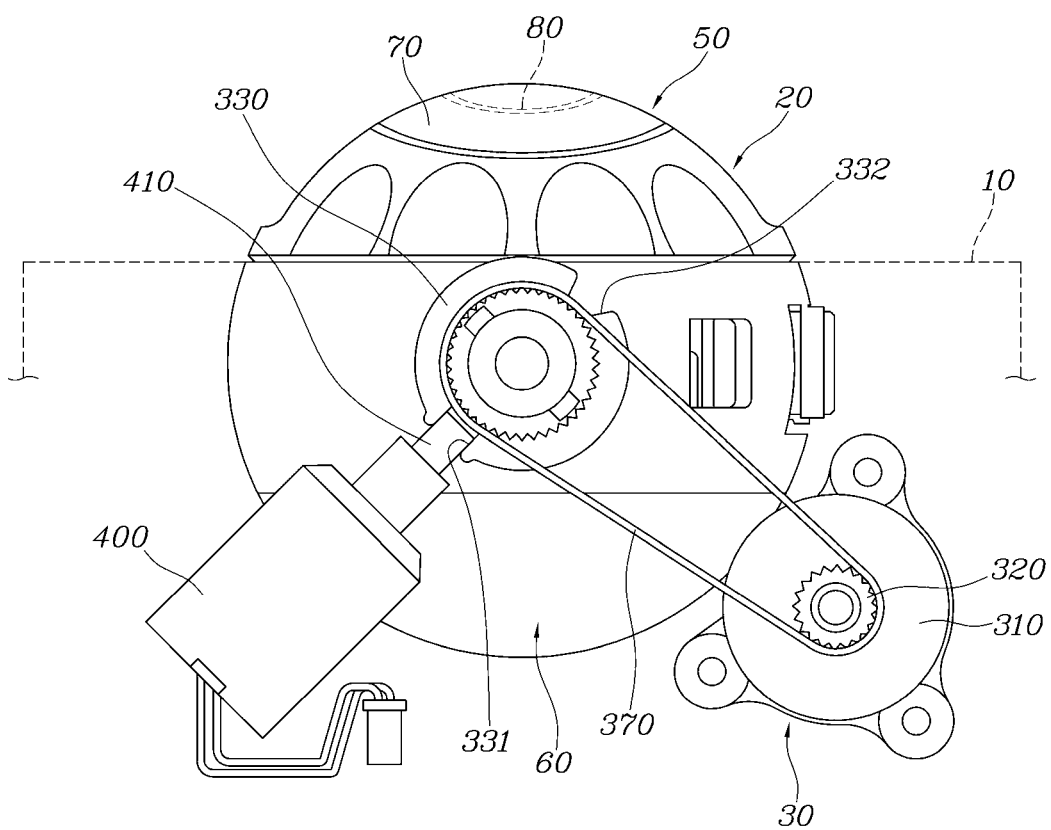
FIG. 5 is a view exemplarily illustrating a position in which the shift control portion is exposed in response to the plunger of the solenoid being inserted into the first pulley recess.

When the plunger 410 of the solenoid 400 is inserted into the first pulley recess 331 of the driven pulley 330 as illustrated in FIG. 5, the spherical mechanism 20 is fixed in position, with the shift control portion 50 being exposed to the interior of the vehicle through the open area of the housing 10.

Because the first pulley recess 331 of the driven pulley 330 has a different shape from the second pulley recess 332, the shift lock function of the spherical mechanism 20 may be realized.

Figure 6:
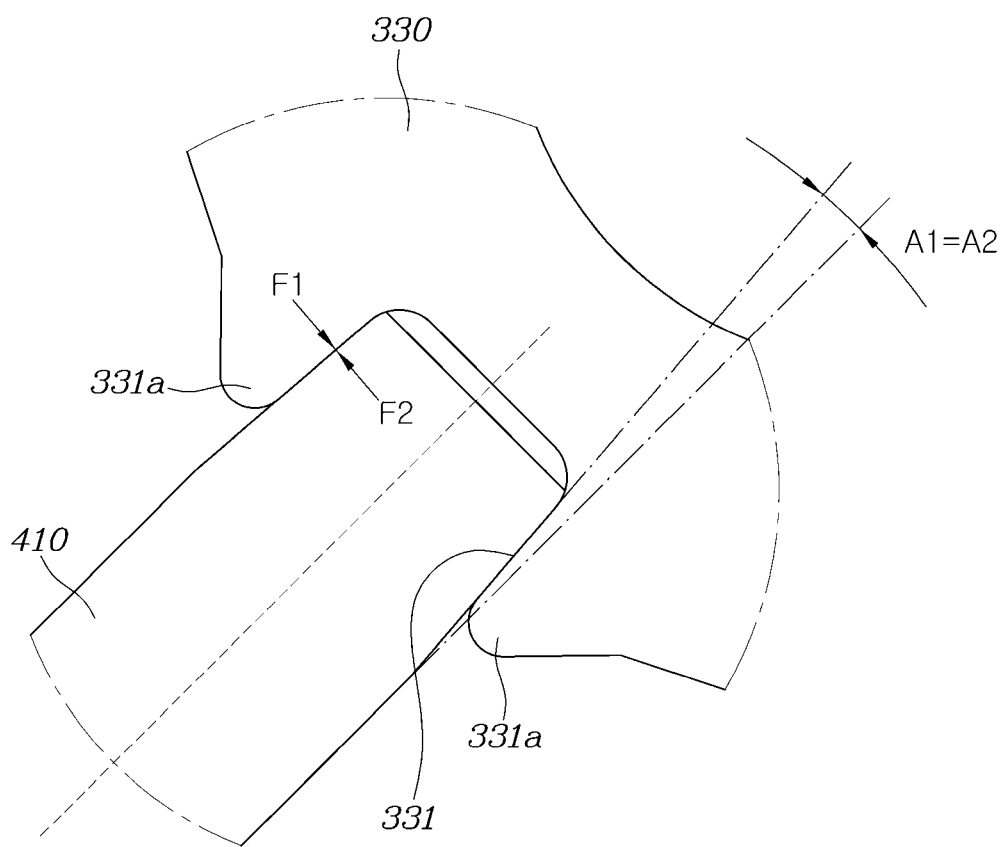
FIG. 6 is an enlarged view exemplarily illustrating the first pulley recess with the plunger inserted thereinto.

That is, FIG. 6 is an enlarged view exemplarily illustrating the plunger 410 of the solenoid 400 inserted into the first pulley recess 331 of the driven pulley 330.

The first pulley recess 331 is configured so that an inclination angle A1 of a side surface thereof is the same as an insertion angle A2 of the plunger 410. When the weight F1 of the user is applied to the driven pulley 330 as the user controls the shift control portion 50, repulsive force F2 acts in the direction opposite to the weight F1, and thus the spherical mechanism 20 is restrained so as not be rotatable, realizing the shift lock.

A protrusion 331a protrudes outwardly from the mouth of the first pulley recess 331.

In a position in which the plunger 410 is inserted into the first pulley recess 331, the protrusion 331a of the first pulley recess 331 is configured to increase a contact area and friction with the plunger 410, further enhancing restrained rotation of the spherical mechanism 20. Consequently, the shift lock function including yet more enhanced performance may be realized.

Figure 7:
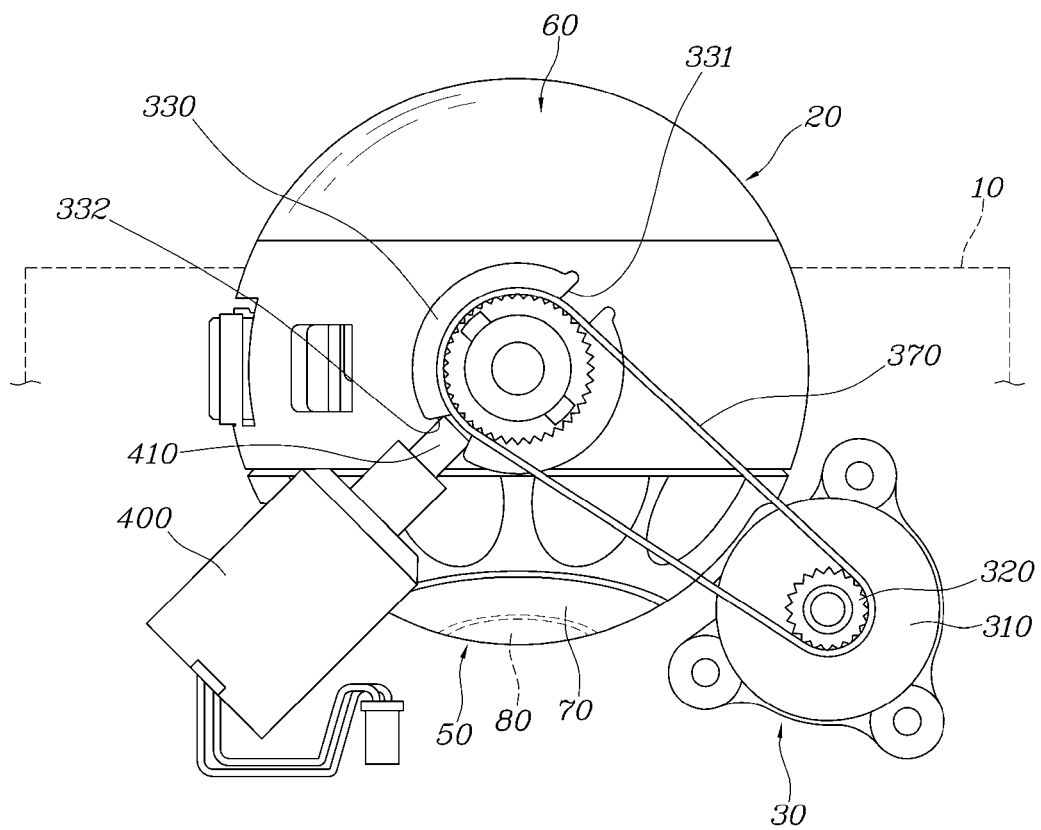
FIG. 7 is a view exemplarily illustrating a position in which the design portion is exposed in response to the plunger of the solenoid being inserted into the second pulley recess.

Furthermore, as illustrated in FIG. 7, when the plunger 410 of the solenoid 400 is inserted into the second pulley recess 332 of the driven pulley 330, the spherical mechanism 20 is fixed in position, with the design portion 60 being exposed to the interior of the vehicle through the open area of the housing 10.

Because the second pulley recess 332 of the driven pulley 330 has a different shape from the first pulley recess 331, the shift lock function of the spherical mechanism 20 may be realized.

Figure 8:
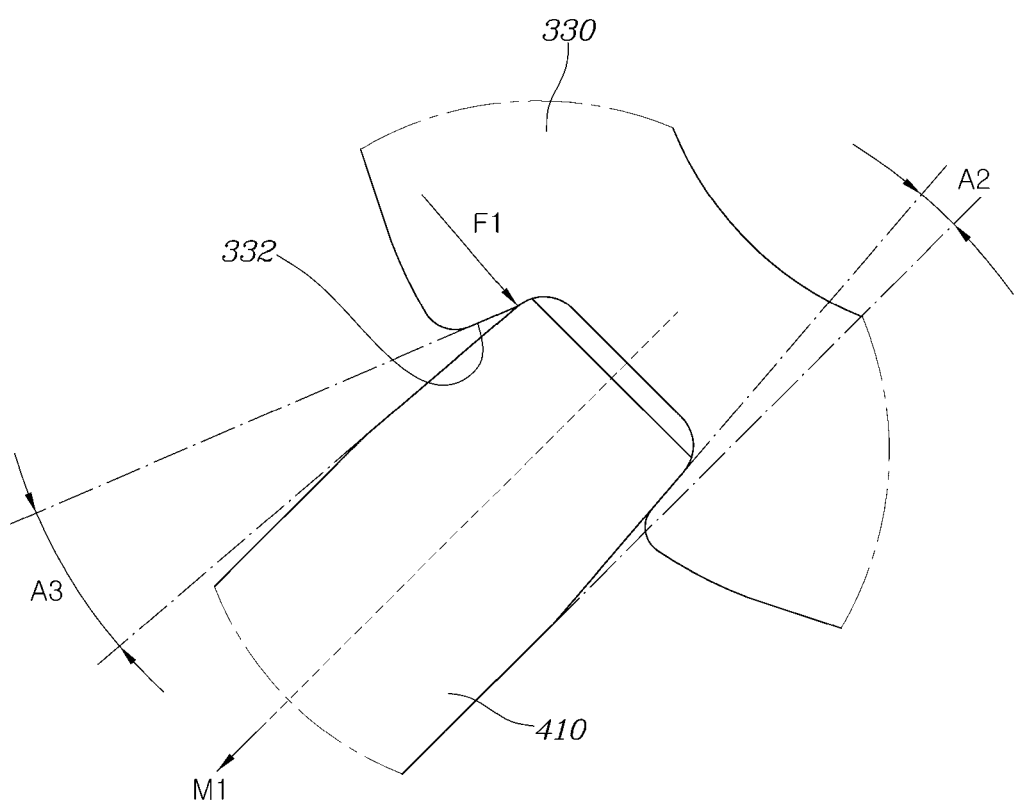
FIG. 8 is an enlarged view exemplarily illustrating the second pulley recess with the plunger inserted thereinto.

That is, FIG. 8 is an enlarged view exemplarily illustrating the plunger 410 of the solenoid 400 inserted into the second pulley recess 332 of the driven pulley 330.

The second pulley recess 332 is configured so that an inclination angle A3 of a side surface thereof is greater than the insertion angle A2 of the plunger 410. When the weight F1 of the user is applied to the driven pulley 330 as the user manually controls the spherical mechanism 20, the friction between the second pulley recess 332 and the plunger 410 is reduced by the inclination angle A3 greater than the insertion angle A2, and thus the plunger 410 is moved backward by overcoming the force of the spring 420. From the moment that the plunger 410 is moved backward and slips from the second pulley recess 332, the spherical mechanism 20 is in a shift lock released position in which the spherical mechanism 20 may be rotated by control of the user.

When the user rotates the spherical mechanism 20 180° in the shift lock released position and the shift control portion 50 is exposed to the interior of the vehicle, the plunger 410 is moved forward again in response to the restoration of the spring 420 to be inserted into the first pulley recess 331 of the driven pulley 330. Consequently, the spherical mechanism 20 may maintain locked by the plunger 410, and the user may safely control the shift control portion 50 of the spherical mechanism 20.

As set forth above, in the sphere-type shift control apparatus of an electronic shift system according to an exemplary embodiment of the present disclosure, the shift control portion 50 which the driver controls to shift gears is provided in one hemispherical portion of the spherical mechanism 20 having a shape of a sphere, whereas the design portion 60 configured to provide indirect illumination and transmit images is provided in the other hemispherical portion of the spherical mechanism 20. When shift control by rotating the spherical mechanism 20 is required, only the shift control portion 50 is exposed to the interior of the vehicle through the open area of the housing 10. When no shift control is required, only the design portion 60 is exposed to the interior of the vehicle through the open area of the housing 10. Consequently, it is possible to improve stability by improving visibility and improve product quality using a high tech image.

Furthermore, according to an exemplary embodiment of the present disclosure, the power transmission component configured to transmit power from the motor 310 to the rotation shaft 40 of the spherical mechanism 20 is implemented as the timing belt 370 or the wire 390. Compared to the related-art structure transmitting power using gears, it is advantageously possible to reduce weight, fabrication cost, and operating noise based on the simplified configuration and improve the feeling of quality by increasing the speed of rotation of the spherical mechanism 20.

Furthermore, according to an exemplary embodiment of the present disclosure, the shift lock function and the shift lock release function may be realized using the first pulley recess 331 and the second pulley recess 332 of the driven pulley 330 and the solenoid 400 including the plunger 410. Due to the simplified configuration, the resultant structure may be advantageously packaged.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A spherical shift control apparatus of an electronic shift system, the apparatus comprising:
    a housing;
    a spherical mechanism rotatably mounted in the housing and including a shift control portion on a first hemispherical portion of the spherical mechanism and a design portion on a second hemispherical portion of the spherical mechanism; and
    a power transmission component coupling a motor and the spherical mechanism and configured to transmit power from the motor to the spherical mechanism, the power transmission component including a timing belt or a wire;
    a driving pulley and a driven pulley coupled to the motor and a rotation shaft of the spherical mechanism, respectively, wherein the timing belt or the wire couples the driving pulley and the driven pulley; and
    a swaging pin provided on a line of the wire to be fixed to an external diameter portion of the driving pulley,
    wherein a pair of pulley levers are provided coaxially with the driven pulley, with first and second end portions of the wire being coupled to the pulley levers, respectively.

2. The apparatus of claim 1, wherein gear teeth having a same pitch are provided on an internal portion of the timing belt, an external diameter portion of the driving pulley, and an external diameter portion of the driven pulley so that the timing belt and the driving pulley are coupled by gear teeth engagement and the timing belt and the driven pulley are coupled by gear teeth engagement.

3. The apparatus of claim 1, further including a pulley spring configured to be disposed between the pulley levers and connected to the pulley levers to apply elastic force to the pulley levers to draw the first end portion and the second end portion of the wire, maintaining a tension of the wire.

4. The apparatus of claim 1, further including a permanent magnet, a printed circuit board (PCB) and a Hall sensor,
    wherein the permanent magnet is coupled to a shaft of the motor, wherein the printed circuit board (PCB) is provided in the housing and includes the Hall sensor facing the permanent magnet, wherein the Hall sensor is configured to detect a change in a magnetic field of the permanent magnet when the shaft of the motor rotates, and wherein the PCB is configured to locate the spherical mechanism and is configured to control an operation of the motor using a signal from the Hall sensor.

5. The apparatus of claim 1, further including a solenoid and a plunger mounted to the solenoid, wherein the solenoid is disposed in the housing to face the driven pulley, wherein the driven pulley incudes first and second pulley recesses provided on an external diameter portion of the driven pulley to be spaced from each other, and wherein the plunger is configured to be selectively inserted into one of the first pulley recess and the second pulley recess.

6. The apparatus of claim 5, wherein, the second pulley recess of the driven pulley has a different shape from the first pulley recess.

7. The apparatus of claim 5, wherein, when the plunger is inserted into the first pulley recess or the second pulley recess, the apparatus is configured such that rotation of the spherical mechanism is stopped and the spherical mechanism is fixed in position, and when the plunger has slipped from the first pulley recess and the second pulley recess, the spherical mechanism is rotatable about the rotation shaft.

8. The apparatus of claim 5, wherein the first pulley recess and the second pulley recess are spaced from each other 180° so that when the plunger is inserted into the first pulley recess, the spherical mechanism is fixed in position, with the shift control portion being exposed outwardly of the housing.

9. The apparatus of claim 8, wherein an inclination angle of a side surface of the first pulley recess is a same as an insertion angle of the plunger so that when a weight of a user is applied to the driven pulley as the user manipulates the shift control portion, repulsive force acts in a direction opposite to the weight, and thus the spherical mechanism is restrained so as not be rotatable, realizing a shift lock.

10. The apparatus of claim 8, wherein a protrusion protrudes outwardly from a mouth of the first pulley recess, and in a position in which the plunger is inserted into the first pulley recess, the protrusion further enhances restrained rotation of the spherical mechanism.

11. The apparatus of claim 5, wherein the first pulley recess and the second pulley recess are spaced from each other 180° so that when the plunger is inserted into the second pulley recess, the spherical mechanism is fixed in position, with the design portion being exposed outwardly of the housing.

12. The apparatus of claim 11, wherein an inclination angle of a side surface of the second pulley recess is greater than an insertion angle of the plunger so that when a weight of a user is applied to the driven pulley as the user manually rotates the spherical mechanism, the plunger is moved backward due to the inclination angle greater than the insertion angle, and when the plunger slips from the second pulley recess through the backward movement, the spherical mechanism is in a shift lock released position in which the spherical mechanism is rotatable by control of the user.

13. The apparatus of claim 1, wherein the spherical mechanism is configured to rotate 180° about a rotation shaft of the spherical mechanism when the motor is operated once so that the shift control portion and the design portion are alternately exposed to an interior of a vehicle.

14. A spherical shift control apparatus of an electronic shift system, the apparatus comprising:

a housing;

a spherical mechanism rotatably mounted in the housing and including a shift control portion on a first hemispherical portion of the spherical mechanism and a design portion on a second hemispherical portion of the spherical mechanism;

a power transmission component coupling a motor and the spherical mechanism and configured to transmit power from the motor to the spherical mechanism, the power transmission component including a timing belt or a wire; and a driving pulley and a driven pulley coupled to the motor and a rotation shaft of the spherical mechanism, respectively, wherein the timing belt or the wire couples the driving pulley and the driven pulley; and a solenoid and a plunger mounted to the solenoid, wherein the solenoid is disposed in the housing to face the driven pulley, wherein the driven pulley incudes first and second pulley recesses provided on an external diameter portion of the driven pulley to be spaced from each other, and wherein the plunger is configured to be selectively inserted into one of the first pulley recess and the second pulley recess.

* * * * *